United States Patent Office 3,152,998
Patented Oct. 13, 1964

3,152,998
NICKEL-COPPER-CHROMIA CATALYST AND
THE PREPARATION THEREOF
Philip H. Moss, Austin, Tex., assignor to Jefferson Chemical Company Inc., Houston, Tex., a corporation of Delaware
No Drawing. Filed June 8, 1960, Ser. No. 34,623
7 Claims. (Cl. 252—470)

This invention relates to a method for preparing heterocyclic nitrogen compounds and to an improved catalyst for effecting this reaction. More particularly, it relates to a process for preparing morpholine, piperazine and C-alkyl derivatives thereof and to a novel nickel-copper-chromia catalyst having improved attrition-resistant properties in the subject process.

Heterocyclic nitrogen compounds such as morpholine, piperazine and like materials, have assumed considerable commercial important because of the wide range of applications for which they are well suited. This commercial interest has evoked intense efforts to provide new and improved methods for their manufacture. In particular, considerable efforts have been expended to provide an improved continuous process for the efficient production of the heterocyclic nitrogen compounds.

Processes for the production of heterocyclic nitrogen compounds generally involve the reaction of an alkylene diamine, alkanolamine and/or an alkylene or dialkylene glycol reactant with ammonia at an elevated temperature and pressure in the presence of a hydrogenation catalyst to produce the desired heterocyclic nitrogen compound. Such processes are the subject of related commonly-assigned co-pending applications S.N. 585,930 filed May 21, 1956; S.N. 662,998 filed June 3, 1957, now U.S. Patent No. 3,037,623 and S.N. 675,036 filed on July 30, 1957. A variety of hydrogenation catalysts, including catalysts comprising nickel, copper and cobalt and various mixtures of same, are effective for promoting the indicated reactions. Indeed, certain of these catalysts when employed in a pulverized or finely divided form are eminently suited to promote the reactions in question when the reaction is conducted in a batch or intermittent operation.

It is widely recognized that the most economical methods for producing large quantities of chemical products require a procedure that is continuous rather than intermittent in operation. In the present case, such a process calls for a procedure in which the reactants are continuously passed through a fixed-bed reaction vessel containing an effective hydrogenation catalyst of the class disclosed above. This catalyst must remain catalytically reactive for a substantial period of time. Moreover, the catalyst must retain its physical structure or form under the conditions of the reaction in order to avoid blocking of the reactor and subsequent breakdown of the operation.

In an endeavor to provide a continuous process, various catalysts, known to be effective for promoting the formation of heterocyclic nitrogen compounds, were prepared and tested in continuous runs. The catalyst compositions were formed into pellets of standard size as is customary for a continuous process. Various lubricants and binders were at times employed in the preparation of these catalyst pellets.

Results from the continuous runs were highly unsatisfactory. The catalysts were found to be subject to rapid attrition under the conditions of this reaction with the result that the catalysts disintegrated to a pulverized mass with subsequent blocking of the reactor. Some of the catalysts were so poor that they softened immediately on contact with the reactant stream. The catalysts tested were found to be particularly susceptible to softening in the presence of water, ammonia and aqueous ammoniacal solutions, environmental conditions not heretofore encountered in the employment of these catalysts.

A method has now been discovered for producing heterocyclic nitrogen compounds in an efficient continuous flow process leading to the economical production of these compounds. This method depends in particular, on the discovery of a preformed catalyst having substantially improved mechanical properties under reaction conditions in the presence of ammonia, water and an aqueous ammoniacal solution. It is understood that while water is produced in this reaction it may be advantageously employed in the reactant feed stream.

In accordance with this invention, heterocyclic nitrogen compounds are prepared in a continuous process in which the catalyst employed comprises in combination the metals and oxides of nickel and copper and chromium oxide. More particularly, the catalyst is characterized by having the composition calculated in mole percent on an oxide-free basis of 60 to 85% nickel, 14 to 37% copper and 1 to 5% chromium with the preferred proportions being 72 to 78% nickel, 20 to 25% copper and 1 to 3% chromium.

A critical feature of the preformed catalyst of this invention is the extent to which the reducible oxide components have been reduced to metal, it being understood that the chromium oxide is not affected under the reducing conditions employed. Surprisingly, it has been found that continuous reactions of the type in question may be effectively conducted for substantial on-stream periods provided that the catalyst composition has been treated so that the amount or percent of reduced nickel is at least 30%. Prereduced catalysts of similar compositions but reduced to a lesser extent are not materially better than unreduced catalyst and are rapidly disintegrated by the aqueous ammoniacal conditions under which this reaction is conducted with the result that the reactor is rendered totally unsuitable for the continuous production of heterocyclic nitrogen compounds.

The catalysts of this invention are produced by preparing a finely divided mixture of the metal oxides according to well known methods wherein the components on a metal basis correspond to the proportions specified above. This mixture of metal oxides is mechanically converted, e.g. compressed or extruded, to the desired physical shape for use in the process. Pellets are the preferred physical shape with sizes such as 1/8" by 1/8" and 1/8" by 3/16" being more suitable. This preformed catalyst mixture may be prepared with a small amount of a die lubricant to facilitate preparation of the pellets.

As noted above, the preformed or pelleted catalysts immediately after formation are not mechanically or physically stable in the reaction for the preparation of heterocyclic nitrogen compounds. Ammonia and water, either as a component of the reactant feed or produced in the reaction, or aqueous ammoniacal mixtures of these can cause the nickel-copper-chroma catalyst to disintegrate very quickly. These catalysts must be reduced by treatment with hydrogen at an elevated temperature until the percent of metallic nickel based on the total catalyst weight is at least 30% and preferably at least 35%. Ordinarily, reduction is effected at a temperature in the range of 250 to 400° C. while hydrogen is continuously passed over or through the catalyst, with temperatures from 300 to 320° C. being preferred for the reduction. Depending on the quantity of catalyst being treated, reduction may be completed in a short time or may require an extended period of many hours. A much large proportion than 30% of the nickel may be reduced with desirable results. Thus, effective physically-stable catalysts may be prepared having as much as 85% reduced nickel.

The metal oxides, or mixtures thereof, used in producing the instant catalysts may be prepared by well known methods. For example, soluble salts, such as the nitrates of nickel, copper and chromium, may be prepared in an aqueous solution and precipitated therefrom as carbonates by the addition of solid ammonium carbonate. An excess of about 5% of the ammonium carbonate is preferred in this step. The precipitated catalyst composition is filtered, washed with water and dried at about 110° C. This material is then calcined in the presence of air desirably at a temperature in the range of 350 to 400° C. until the carbonate salts have been converted to the corresponding oxides.

The process of this invention may be employed to prepare a wide range of heterocyclic nitrogen compounds including piperazine and its carbon-substituted alkyl derivatives, cycloaliphatic amines from cycloalkanols and morpholine and its carbon-substituted alkyl derivatives. A wide range of reactants may be employed in these reactions together with ammonia and/or water as a component of the feed reactants to produce the various heterocyclic nitrogen compounds. Water in the proportion of about 5% to about 40% by weight of the reactants is a valuable component to control reaction temperatures in a continuous reaction. Aside from ammonia, the various reactants which may be employed include the alkylene glycols, dialkylene glycols, alkanolamines, and alkylene diamines. These reactants may be represented by the formula:

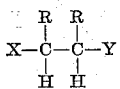

in which X represents OH or $NH_2$, each R represents hydrogen or a lower alkyl radical, and Y represents

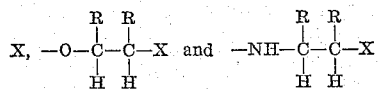

in which X and R have the values noted above.

Specific reactants which may be employed with ammonia in the instant process to prepare heterocyclic nitrogen compounds include ethylene glycol, propylene glycol, diethylene glycol, dipropylene glycol, ethanolamine, diethanolamine, ethylenediamine, propylenediamine, isopropanolamine, 2-aminopropanol-1, 2,3-butylene glycol, 2-amino-3-hydroxy-butane and similar materials. Under certain conditions, it is advantageous to employ a mixture or a plurality of the starting reactants represented by the formula in a reaction with ammonia. For example, it is contemplated that the present reaction may be conducted by reacting ethylene glycol with ethylenediamine in the presence of ammonia to produce a piperazine compound. Similarly, monoethanolamine may be reacted with isopropanolamine in the presence of ammonia to effect the formation of a monosubstituted piperazine compound.

Ammonia is essential in the instant reaction. In certain instances, such as when ethylene glycol is reacted to form piperazine, or diethylene glycol is reacted to form morpholine, ammonia is essential to satisfy the stoichiometrical balance of the reaction. In other instances, such as when monoethanolamine is reacted to form piperazine, or ethylene glycol is reacted with ethylene diamine to form piperazine, the stoichiometrical requirements are satisfied without free ammonia being present. However, in both situations, it has been observed that an excess of ammonia substantially improves the yields in the instant process. For this reason, the mole proportion of ammonia is generally employed in an excess up to a proportion of 5 moles of ammonia per mole of the companion glycol or amine reactant. It is preferred to employ an excess of 2 to 4 moles of ammonia for each mole of the companion reactant.

The instant process may be conducted in the absence of hydrogen. It has been observed, however, that hydrogen substantially improves the efficiency of this process for the production of heterocyclic nitrogen compounds. While the reason for this is obscure, it is thought that the hydrogen may be effective in maintaining the activity of the catalyst. Maintenance of the activity of the catalysts is particularly desirable since this process is to be operated on a continuous basis.

Heterocyclic nitrogen compounds are desirably produced at elevated temperatures. Thus, this reaction is generally conducted at a temperature ranging from about 150° C. up to about 400° C. with the most suitable temperatures being from 220° C. to about 260° C.

This reaction is also conducted under a superatmospheric pressure, more specifically, at a pressure sufficient to maintain a substantial proportion of the reactants in the liquid phase. It has been found convenient for this purpose to employ pressures ranging from about 30 up to about 400 atmospheres.

This process is effective to produce relatively high yields of the heterocyclic compounds. Yields of the lower alkyl-substituted piperazine and morpholines will ordinarily range from about 40 to about 95%, while piperazine and morpholine yields will range from about 35 to about 80%.

The mechanical or physical stability of the catalysts of this invention is more particularly illustrated below:

EXAMPLE I

A series of seven similar catalysts were prepared from nickel, copper and chromium oxides. These catalysts had compositions in which the metal content calculated on an oxide-free basis was 75 mole percent Ni, 23 mole percent Cu, and 2 mole percent Cr. Pellets of ⅛″ x ⅛″ or 3/16″ x ⅛″ were prepared from these compositions. The pellets were reduced by heating them in the presence of hydrogen at from 300° to 320° C. for varying lengths of time in order to produce catalysts in which the percent reduced nickel was varied over a wide range. The amount of reduction was determined by analysis and is expressed as the percent of reduced nickel in the catalyst composition.

To determine the physical stability of these catalyst preparations, samples were evaluated in the continuous pilot plant production of morpholine or piperazine under temperature and pressure conditions usually employed for preparing these materials. The catalysts samples were kept under these conditions for periods ranging from 18 to 23 days after which time they were removed from the reactor and the percent of whole catalyst pellets recovered was determined as a measure of the stability of each of the catalyst compositions. The results are given in Table I below:

Table I

THE INFLUENCE OF PREREDUCTION OF CATALYSTS ON TABLET STRENGTH

| Pelleted Catalysts | Percent Reduced Ni | Percent Whole pellets recovered |
|---|---|---|
| 1. Lot A, ⅛″ x ⅛″ | 61.7 | 99 |
| 2. Lot B, ⅛″ x ⅛″ | 50.2 | 96 |
| 3. Lot C, 3/16″ x ⅛″ | 32.6 | 100 |
| 4. Lot D, 3/16″ x ⅛″ | 26.6 | 23 |
| 5. Lot E, ⅛″ x ⅛″ | 16.8 | 0 |
| 6. Lot F, ⅛″ x ⅛″ | 13.8 | 0 |
| 7. Lot G, ⅛″ x ⅛″ | 8–9 | 0 |

It can be seen from the above results that there is a critical point in the degree of reduction at which the catalyst pellets or tablets are changed from compositions that are rapidly softened and pulverized under reaction conditions to compositions that have surprising physical stability and are highly resistant to attrition or pulverization. This critical change in the physical stability of the catalyst takes place at a point at which there is at least about 30% reduced nickel in the catalyst. Catalysts reduced to a lesser extent have no physical stability under the conditions employed for preparing heterocyclic nitrogen compounds and are totally unsuited for a continuous process for this purpose. The physically stable catalysts are those in which the percent reduced metal ranges from about 30% to about 90%.

Obviously, many modifications and variations of the invention as hereinbefore set forth may be made without departing from the spirit and scope thereof and, therefore, only such limitations should be imposed as are indicated in the appended claims.

I claim:

1. In a method for preparing a pelleted catalyst composition wherein catalyst pellets are prepared from a mixture of oxides of nickel, copper and chromium, wherein the proportions of the metals in said mixture, calculated on an oxide-free basis, are 60 to 85 mol percent nickel, 14 to 37 mol percent copper and 1 to 5 mol percent chromium; the improvement for stabilizing said pelleted catalyst composition to softening of said pellets by water, ammonia, and mixtures thereof, which improvement consists essentially of the steps of reducing the nickel and copper oxides in said pellets by contacting said pellets with hydrogen at a temperature within the range from about 250° to about 400° C. until the precentage of reduced nickel is from abou 30% to 100%.

2. A method as in claim 1 wherein the temperature is within the range of 300° to 320° C. and wherein reduction is continued until the percentage of reduced nickel is within the range of about 30% to about 85%.

3. A physically stable, catalytically active, preformed pelleted nickel, copper, chromium catalyst composition resistant to softening by water, ammonia and mixtures thereof, said catalyst having been prepared by pelleting a mixture of oxides of nickel, copper and chromium, and then reducing said pelleted mixture in the presence of hydrogen at a temperature within the range of from about 250° to about 400° C. until the percentage of reduced nickel is at least 30%, the proportions of the metals in the mixture to each other, calculated on an oxide-free basis, being 60 to 85 mol percent nickel, 14 to 37 mol percent copper and 1 to 5 mol percent chromium.

4. The composition as in claim 3 wherein reduction in the presence of hydrogen is at a temperature within the range of from about 300° to about 320° C. and wherein the reduction is continued until the percentage of reduced nickel is within the range of about 30% to about 85%.

5. In a method for preparing a catalytically active, stable, pelleted catalyst composition wherein the catalytic component consists of a mixture of oxides of nickel, copper and chromium in which the proportions of the metals, calculated on an oxide-free basis, are 60 to 85 mol percent nickel, 14 to 37 mol percent copper and 1 to 5 mol percent chromium; the improved method for preparing a physically stable, catalytically active, preformed catalyst composition resistant to softening by water, ammonia, and mixtures thereof, consisting essentially of the steps of pelleting said mixture of oxides and reducing said pelleted mixture prior to use in the presence of hydrogen at a temperature in the range of from about 250° to about 400° C. until the percentage of reduced nickel is at least 30%.

6. A method as in claim 5 wherein the temperature is within the range of about 300° to about 320° C. and wherein the reduction is continued until the percentage of reduced nickel is within the range of about 30% to about 85%.

7. A method as in claim 6 wherein the proportions of the metals in the mixed oxides, calculated on an oxide-free basis, are about 75 mol percent nickel, about 23 mol percent copper and about 2 mol percent chromium.

References Cited in the file of this patent

UNITED STATES PATENTS

| | | |
|---|---|---|
| 1,968,063 | Woodhouse | July 31, 1934 |
| 2,136,509 | Jenness | Nov. 15, 1938 |
| 2,510,189 | Nakin et al. | June 6, 1950 |
| 2,861,995 | Mackenzie | Nov. 25, 1958 |
| 2,900,423 | Smith | Aug. 18, 1959 |
| 2,911,407 | Langdon et al. | Nov. 3, 1959 |